(12) United States Patent
Nishijima et al.

(10) Patent No.: US 10,770,716 B2
(45) Date of Patent: Sep. 8, 2020

(54) NON-AQUEOUS ELECTROLYTE SECONDARY BATTERY

(71) Applicant: Envision AESC Japan Ltd., Zama-shi, Kanagawa (JP)

(72) Inventors: Manabu Nishijima, Kanagawa (JP); Fumihiro Kawamura, Kanagawa (JP); Masanori Suenaga, Kanagawa (JP); Yuji Muroya, Kanagawa (JP)

(73) Assignee: Envision AESC Japan Ltd., Zama-shi, Kanagawa (JP)

(*) Notice: Subject to any disclaimer, the term of this patent is extended or adjusted under 35 U.S.C. 154(b) by 0 days.

(21) Appl. No.: 16/308,136

(22) PCT Filed: Jun. 8, 2016

(86) PCT No.: PCT/JP2016/067138
§ 371 (c)(1),
(2) Date: Jan. 28, 2019

(87) PCT Pub. No.: WO2017/212596
PCT Pub. Date: Dec. 14, 2017

(65) Prior Publication Data
US 2019/0165361 A1    May 30, 2019

(51) Int. Cl.
*H01M 4/131* (2010.01)
*H01M 4/13* (2010.01)
(Continued)

(52) U.S. Cl.
CPC ............ *H01M 4/131* (2013.01); *H01M 4/13* (2013.01); *H01M 4/133* (2013.01); *H01M 4/134* (2013.01);
(Continued)

(58) Field of Classification Search
CPC .................................................... H01M 4/131
See application file for complete search history.

(56) References Cited

U.S. PATENT DOCUMENTS 6,344,296 B1    2/2002  Ishii et al.
6,455,199 B1    9/2002  Kitagawa et al.
(Continued)

FOREIGN PATENT DOCUMENTS

JP    H10214617 A    8/1998
JP    H10236809 A    9/1998
(Continued)

OTHER PUBLICATIONS

Berhaut, LiTDI as electrolyte salt for Li-ion batteries:transport properties in EC/DMC, Elsevier (Year: 2015).*

*Primary Examiner* — Brian R Ohara
(74) *Attorney, Agent, or Firm* — Young Basile Hanlon & MacFarlane, P.C.

(57) ABSTRACT

A flat stacked type non-aqueous electrolyte secondary battery includes: a positive electrode comprising a a positive electrode active material formed on a surface of a positive electrode current collector, a negative electrode comprising a negative electrode active material formed on a surface of a negative electrode current collector, and an electrolyte layer, wherein a ratio of a rated capacity to a pore volume of the negative electrode active material layer is 1.12 Ah/cc or more, a ratio of a battery area to a rated capacity is 4.0 $cm^2$/Ah or more, and a rated capacity is 30 Ah or more, and the electrolyte layer contains an electrolyte solution containing an electrolyte salt dissolved and a value obtained by dividing a weight of an electrolyte salt in pores in the negative electrode active material layer by a weight of the negative electrode active material is 0.031 or more.

3 Claims, 1 Drawing Sheet

(51) Int. Cl.
  *H01M 4/133*    (2010.01)
  *H01M 4/134*    (2010.01)
  *H01M 4/505*    (2010.01)
  *H01M 4/525*    (2010.01)
  *H01M 10/0525*  (2010.01)
  *H01M 10/056*   (2010.01)
  *H01M 10/0566*  (2010.01)
  *H01M 10/0567*  (2010.01)
  *H01M 10/0569*  (2010.01)
  *H01M 10/052*   (2010.01)
  *H01M 4/02*     (2006.01)
  *H01M 10/42*    (2006.01)

(52) U.S. Cl.
  CPC .......... *H01M 4/505* (2013.01); *H01M 4/525* (2013.01); *H01M 10/056* (2013.01); *H01M 10/0525* (2013.01); *H01M 10/0566* (2013.01); *H01M 10/0567* (2013.01); *H01M 10/0569* (2013.01); *H01M 10/052* (2013.01); *H01M 2004/021* (2013.01); *H01M 2010/4292* (2013.01); *H01M 2300/002* (2013.01); *Y02E 60/122* (2013.01); *Y02T 10/7011* (2013.01)

(56) References Cited

U.S. PATENT DOCUMENTS

| | | | |
|---|---|---|---|
| 2008/0166637 | A1* | 7/2008 | Inagaki ............... H01M 4/366 |
| | | | 429/329 |
| 2011/0281143 | A1* | 11/2011 | He ....................... H01M 4/13 |
| | | | 429/7 |
| 2012/0141871 | A1 | 6/2012 | Inagaki et al. |
| 2014/0325807 | A1* | 11/2014 | Anouti ................. H01G 11/62 |
| | | | 29/25.03 |
| 2016/0043402 | A1 | 2/2016 | Hagiyama et al. |
| 2016/0064715 | A1 | 3/2016 | Honda et al. |
| 2017/0077486 | A1 | 3/2017 | Ishii |

FOREIGN PATENT DOCUMENTS

| | | |
|---|---|---|
| JP | H1145715 A    | 2/1999 |
| JP | 2013179101 A  | 9/2013 |
| JP | 2013196781 A  | 9/2013 |
| JP | 2014063671 A  | 4/2014 |
| JP | 2015167065 A  | 9/2015 |
| JP | 2015220119 A  | 12/2015 |
| JP | 2016024987 A  | 2/2016 |
| KR | 20140085337 A | 7/2014 |
| KR | 20150123305 A | 11/2015 |
| KR | 20150123897 A | 11/2015 |

* cited by examiner

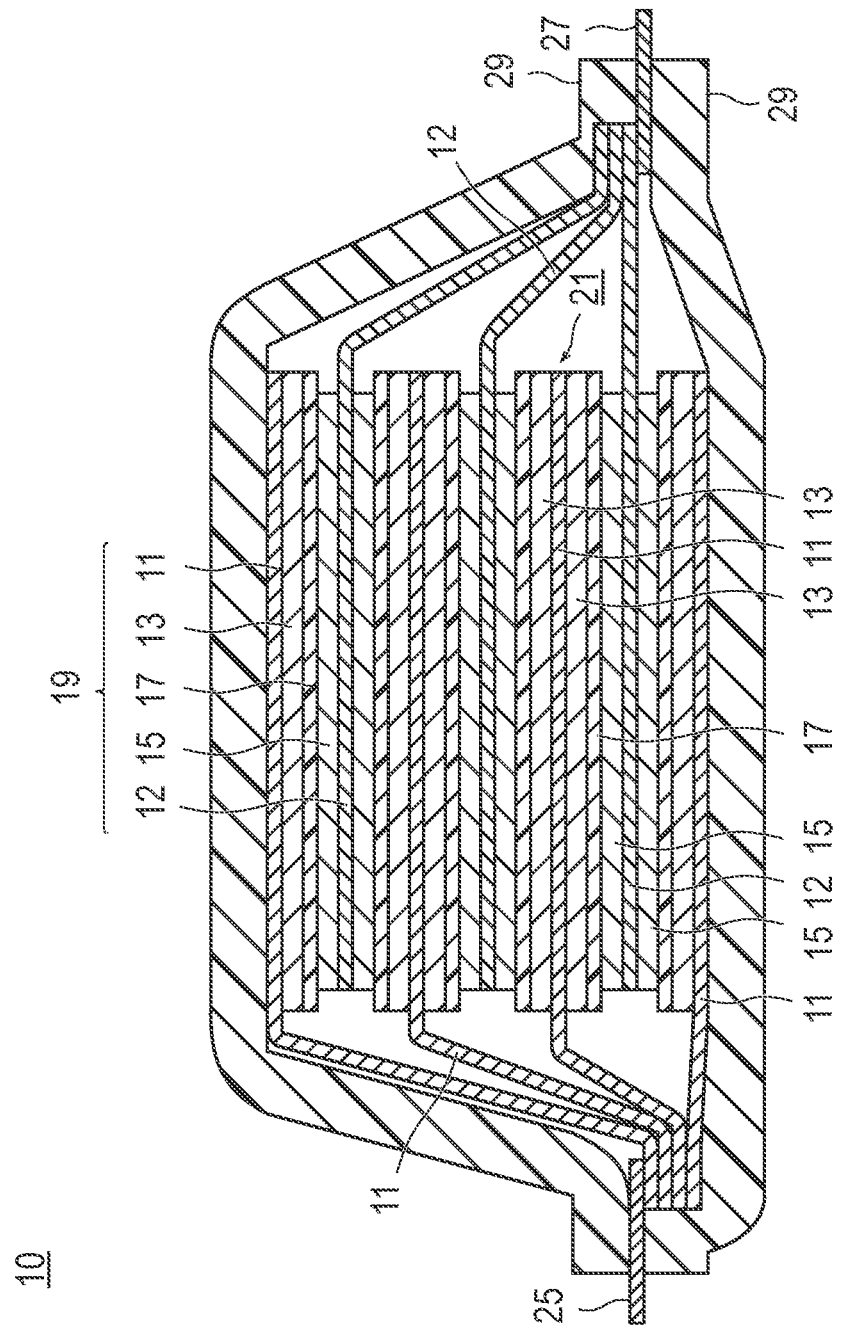

though a density of the negative electrode active material layer is increased as the capacity of the battery is increased, penetration of the electrolyte solution into the negative electrode active material layer is hindered as a porosity in the negative electrode active material layer is decreased, it is partially difficult to donate and receive lithium ions, and the reaction in the negative electrode active material layer takes place ununiformly in some cases. A part of the negative electrode active material is put in an overcharged or overdischarged state by such a local reaction, the generation of lithium dendrite and the reductive decomposition of the electrolyte solution are likely to proceed, and the cycle characteristics deteriorate in some cases.

US 10,770,716 B2

NON-AQUEOUS ELECTROLYTE SECONDARY BATTERY

TECHNICAL FIELD

The present invention relates to a non-aqueous electrolyte secondary battery.

BACKGROUND

Currently, non-aqueous electrolyte secondary batteries including lithium ion secondary batteries, which are utilized in mobile devices such as mobile phones, have been commercialized. Non-aqueous electrolyte secondary batteries generally have a configuration in which a positive electrode in which a positive electrode active material and the like are coated on a current collector and a negative electrode in which a negative electrode active material and the like are coated on a current collector are connected to each other via an electrolyte layer in which a non-aqueous electrolyte solution is held in a separator. Moreover, the charge and discharge reaction of the battery takes place as ions such as lithium ions are occluded in and released from the electrode active material.

In recent years, however, it has been demanded to diminish the amount of carbon dioxide in order to cope with global warming. Hence, non-aqueous electrolyte secondary batteries with less environmental burden are being utilized not only in mobile devices and the like but also in power supply devices of electrically driven vehicles such as hybrid electric vehicles (HEV), electric vehicles (EV), and fuel cell vehicles.

Non-aqueous electrolyte secondary batteries intended to be applied to electrically driven vehicles is demanded to have a high output and a high capacity. Furthermore, non-aqueous electrolyte secondary batteries intended to be applied to electrically driven vehicles are demanded to exhibit cycle characteristics capable of maintaining the capacity even when the charge and discharge cycle is repeated for a long period of time.

However, a density of the negative electrode active material layer is increased as the capacity of the battery is increased, penetration of the electrolyte solution into the negative electrode active material layer is hindered as a porosity in the negative electrode active material layer is decreased, it is partially difficult to donate and receive lithium ions, and the reaction in the negative electrode active material layer takes place ununiformly in some cases. A part of the negative electrode active material is put in an overcharged or overdischarged state by such a local reaction, the generation of lithium dendrite and the reductive decomposition of the electrolyte solution are likely to proceed, and the cycle characteristics deteriorate in some cases.

JP 2013-179101 A discloses a technique to use composite graphite particles in which natural graphite is compounded with carbonaceous or graphite materials as a negative electrode active material of a non-aqueous electrolyte secondary battery. It is described that, by adopting such a configuration, it is possible to obtain a battery exhibiting favorable penetrability of the electrolyte solution and excellent cycle characteristics even when the density of the negative electrode active material layer is increased in order to attain a high capacity.

Particularly non-aqueous electrolyte secondary batteries for electrically driven vehicles are demanded to have an extended cruising distance on a single charge and improved battery durability (cycle characteristics in repeated charge and discharge) in addition to a high capacity and a high output. However, according to the investigations by the inventors of the present invention, it has been revealed that the cycle characteristics cannot be sufficiently obtained in some cases when a flat stacked type battery having a high capacity, a high density, and a large area is fabricated by the technique described in JP 2013-179101 A.

Particularly in a flat stacked type battery having a large area, it is found that it is difficult to uniformly pressurize the active material layer in a plane of the active material layer when the battery is pressurized in the stacked direction, pressure distribution is generated in the plane of the active material layer, the current concentrates on a local site at which the overvoltage is great, decomposition of the electrolyte solution at the time of charge and formation of SEI film on the negative electrode surface occur, and the cycle durability is likely to deteriorate.

SUMMARY

Accordingly, an object of the present invention is to provide a non-aqueous electrolyte secondary battery exhibiting improved battery durability in a flat stacked type battery having a high capacity, a high density and a large area.

The inventors of the present invention have carried out intensive investigations to solve the above problem. As a result, it has been found out that the above problem can be solved by controlling the proportion of the weight of the electrolyte salt in the pores in the negative electrode active material layer to the weight of the negative electrode active material to a predetermined value in a non-aqueous electrolyte secondary battery having a capacity and a size corresponding to a high capacity, whereby the present invention has been completed.

That is, according to an embodiment of the present invention, there is provided a flat stacked type non-aqueous electrolyte secondary battery including a power generating element including: a positive electrode comprising a positive electrode active material layer containing a positive electrode active material formed on a surface of a positive electrode current collector, a negative electrode comprising a negative electrode active material layer containing a negative electrode active material formed on a surface of a negative electrode current collector, and an electrolyte layer, wherein a ratio of a rated capacity to a pore volume of the negative electrode active material layer is 1.12 Ah/cc or more, a ratio of a battery area to a rated capacity is 4.0 cm$^2$/Ah or more, and a rated capacity is 30 Ah or more, and the electrolyte layer contains an electrolyte solution containing an electrolyte salt dissolved and a value obtained by dividing a weight of an electrolyte salt in pores in the negative electrode active material layer by a weight of the negative electrode active material is 0.031 or more.

BRIEF DESCRIPTION OF THE DRAWINGS

FIG. 1 is a schematic cross-sectional view illustrating a basic configuration of a non-aqueous electrolyte lithium ion secondary battery which is a flat type (stacked type) but not a bipolar type and is an embodiment of a non-aqueous electrolyte secondary battery.

DETAILED DESCRIPTION

An embodiment of the present invention is a flat stacked type non-aqueous electrolyte secondary battery which includes a power generating element including a positive electrode comprising a positive electrode active material layer containing a positive electrode active material formed on a surface of a positive electrode current collector, a negative electrode comprising a negative electrode active material layer containing a negative electrode active material formed on a surface of a negative electrode current collector, and an electrolyte layer, wherein a ratio of a rated capacity to a pore volume of the negative electrode active material layer is 1.12 Ah/cc or more, a ratio of a battery area to a rated capacity is 4.0 cm$^2$/Ah or more, a rated capacity is 30 Ah or more, and the electrolyte layer contains an electrolyte solution containing an electrolyte salt dissolved, and a value obtained by dividing a weight of an electrolyte salt in pores in the negative electrode active material layer by a weight of the negative electrode active material is 0.031 or more.

In the present invention, the electrolyte solution can uniformly penetrate into the negative electrode active material in a flat stacked type battery having a high capacity, a high density and a large area by controlling the value obtained by dividing the weight of the electrolyte salt in the pores in the negative electrode active material layer by the weight of the negative electrode active material to 0.031 or more. As a result, the reaction resistance decreases, the reaction can uniformly proceed, and thus a non-aqueous electrolyte secondary battery exhibiting excellent durability can be obtained.

In recent years, electric vehicles have attracted attention since they are regarded to be friendly to the environment, but the cruising distance thereof is shorter and the shortness of cruising distance thereof is remarkable particularly when using the air-conditioning (cooling, heating) system as compared with gasoline-powered vehicles. For this reason, a non-aqueous electrolyte secondary battery, particularly a non-aqueous electrolyte secondary battery for electrically driven vehicles, is required to have a high output and a high capacity in order to extend the cruising distance on a single charge. In addition, in batteries to be mounted on electrically driven vehicles, it is an important task to improve the durability (cycle characteristics) so that the high output and high capacity do not decrease even by repeated charge and discharge at a large current for a short time.

However, in a battery having a high capacity, the pores in the negative electrode active material layer tend to be relatively small since a design having a high basis weight and a high density is adopted. For this reason, a concentration gradient of Li ions in the pores (between particles and in particles) is likely to be generated during charge and discharge and a local overvoltage is likely to be generated. It is found that the negative electrode is lower than the electrodeposition potential of Li when a local overvoltage is generated at the time of charge, thus the generation of Li dendrite and reductive decomposition (film formation) of the electrolyte solution proceed and deterioration in the durability of the battery is likely to occur.

In addition, in a flat stacked type non-aqueous electrolyte secondary battery having a large area, pressure distribution is generated in a plane of the negative electrode active material layer at the time of pressurization and a state is obtained in which the overvoltage is different in the negative electrode active material layer by such pressure distribution.

Under such circumstances, a burden is likely to be put on the negative electrode active material at the time of charge and discharge and the life span is likely to deteriorate. In addition, in a cell having a large capacity and a high capacity density with respect to the pore volume of the negative electrode active material layer, the diffusibility of lithium ions is poor in a case in which charge and discharge are repeatedly performed at a large current for a short time as in a vehicle application and thus the variation in overvoltage in the plane at the time of charge is great by the variation of the pore amount of the negative electrode active material layer in the in-plane direction. Li is likely to be precipitated at places at which the overvoltage is large, and thus deterioration in life span of the battery is likely to occur. In addition, it is found that the resistance is great for lithium ions to diffuse into the inside of the negative electrode active material layer when the thickness of the negative electrode active material layer is increased in order to attain a high capacity and a high density, thus the reaction on the surface side becomes excessive, as a result, Li precipitation, reductive decomposition of the electrolyte solution and the like, which are side reactions, are caused and the durability deteriorates in some cases.

In contrast, in the present invention, the reaction resistance decreases since the amount of lithium ions optimum for the current density in the negative electrode active material layer can be secured in the pores in the negative electrode active material layer by setting the value obtained by dividing the weight of the electrolyte salt in the pores in the negative electrode active material layer by the weight of the negative electrode active material to 0.031 or more. In addition, lithium ions are uniformly distributed in the in-plane direction and thickness direction of the negative electrode active material layer and the reaction can uniformly proceed since a sufficient amount of lithium ions can be secured in the pores in the negative electrode active material layer. As a result, a non-aqueous electrolyte secondary battery exhibiting excellent durability can be obtained.

Hereinafter, embodiments of the present invention will be described with reference to the accompanying drawings. Incidentally, in the description of the drawings, the same elements are denoted by the same reference numerals and duplicate descriptions are omitted. In addition, the dimensional ratios in the drawings are exaggerated for convenience of explanation and may differ from the actual ratios.

[Non-Aqueous Electrolyte Secondary Battery]

FIG. 1 is a schematic cross-sectional view schematically illustrating the outline of a flat stacked type battery, which is an embodiment of the battery of the present invention. By adopting a stacked type, it is possible to obtain a battery which is compact and has a high capacity. Incidentally, in the present specification, a lithium ion secondary battery, which is a flat stacked type but not a bipolar type and is illustrated in FIG. 1, will be described in detail as an example.

First, the overall structure of the non-aqueous electrolyte secondary battery of the present invention will be described with reference to the drawings.

[Overall Structure of Battery]

FIG. 1 is a schematic cross-sectional view schematically illustrating the basic configuration of a non-aqueous electrolyte lithium ion secondary battery (hereinafter also simply referred to as a "stacked type battery") which is a flat stacked type but not a bipolar type. As illustrated in FIG. 1, a stacked type battery 10 of the present embodiment has a structure in which a substantially rectangular flat power generating element 21 in which a charge and discharge reaction actually takes place is sealed inside a battery outer casing material 29 which is an outer casing body. Here, the power generating element 21 has a structure in which a positive electrode, an electrolyte layer 17, and a negative electrode are layered. Incidentally, the electrolyte layer 17 is equipped with a separator and a non-aqueous electrolyte (for example, a liquid electrolyte). The positive electrode has a structure in which a positive electrode active material layer 15 is disposed on both sides of a positive electrode current collector 12. The negative electrode has a structure in which a negative electrode active material layer 13 is disposed on both sides of a negative electrode current collector 11. Specifically, the negative electrode, the electrolyte layer and the positive electrode are layered in this order so that one positive electrode active material layer 15 and the negative electrode active material layer 13 adjacent to this face each other via the electrolyte layer 17. By this, the adjacent positive electrode, electrolyte layer, and negative electrode constitute one single battery layer 19. Consequently, it can also be said that the stacked type battery 10 illustrated in FIG. 1 has a configuration in which a plurality of single battery layers 19 are electrically connected in parallel by being stacked one on another.

Incidentally, the negative electrode active material layer 13 is disposed only on one side of each of the outermost layer negative electrode current collectors positioned at both outermost layers of the power generating element 21, but the active material layer may be provided on both sides thereof. In other words, a current collector having an active material layer on both sides may be used as it is as the current collector of the outermost layer instead of using a current collector dedicated to the outermost layer in which the active material layer is provided only on one side. In addition, the single-sided positive electrode active material layer on the outermost layer positive electrode current collector may be disposed so that the outermost layer positive electrode current collector may be positioned on both outermost layers of the power generating element 21 by reversing the disposition of the positive electrode and the negative electrode from that in FIG. 1.

The positive electrode current collector 12 and the negative electrode current collector 11 have a structure in which a positive electrode current collecting plate (tab) 27 and a negative electrode current collecting plate (tab) 25, which are electrically conducted with the respective electrodes (positive electrode and negative electrode), are respectively attached to the positive electrode current collector 12 and the negative electrode current collector 11 and led to the outside of the battery outer casing material 29 so as to be sandwiched between the end portions of the battery outer casing material 29. The positive electrode current collecting plate 27 and the negative electrode current collecting plate 25 may be respectively attached to the positive electrode current collector 12 and the negative electrode current collector 11 of the respective electrodes via a positive electrode lead and a negative electrode lead (not illustrated) by ultrasonic welding, resistance welding or the like if necessary.

Incidentally, a stacked type battery which is a flat stacked type but not a bipolar type is illustrated in FIG. 1, but the battery may be a bipolar battery including a bipolar electrode having a positive electrode active material layer electrically coupled with one side of a current collector and a negative electrode active material layer electrically coupled with the opposite side of the current collector. In this case, one current collector serves as a positive electrode current collector and a negative electrode current collector at the same time.

Hereinafter, the respective members constituting the non-aqueous electrolyte lithium ion secondary battery which is an embodiment of the present invention will be described.

[Positive Electrode]

The positive electrode has a positive electrode current collector and a positive electrode active material layer, which contains a positive electrode active material and is formed on the surface of the positive electrode current collector.

(Positive Electrode Current Collector)

The material constituting the positive electrode current collector is not particularly limited, but a metal is suitably used. Specifically, examples of the metal may include aluminum, nickel, iron, stainless steel, titanium, and other alloys. In addition, the same materials as those described above or copper and the like can be used in the case of using a negative electrode current collector in the negative electrode to be described later as well. In addition to these, a clad material of nickel and aluminum, a clad material of copper and aluminum, a plated material of a combination of these metals, and the like can be preferably used. In addition, the material may be a foil in which aluminum is covered on a metal surface. Among these, aluminum and stainless steel are preferable as the positive electrode current collector and copper is preferable as the negative electrode current collector from the viewpoint of electron conductivity and battery operating potential.

The size of the current collector is determined depending on the intended use of the battery. For example, a current collector having a large area is used when being used in a large-sized battery required to have a high energy density. The thickness of the current collector is also not particularly limited. The thickness of the current collector is usually about from 1 to 100 µm.

(Positive Electrode Active Material Layer)

The positive electrode active material layer 15 contains a positive electrode active material and further a binder and other additives such as a conductive aid, and an electrolyte (a polymer matrix, an ion conductive polymer, an electrolyte solution, or the like), and a lithium salt for enhancing the ion conductivity if necessary.

(Positive Electrode Active Material)

Examples of the positive electrode active material may include lithium-transition metal composite oxides such as $LiMn_2O_4$, $LiCoO_2$, $LiNiO_2$, $Li(Ni-Mn-Co)O_2$ and those in which a part of these transition metals are substituted with other elements, a lithium-transition metal phosphate compound and a lithium-transition metal sulfate compound. Preferably, a lithium-transition metal composite oxide is used as a positive electrode active material from the viewpoint of capacity and output characteristics. In some cases, two or more kinds of positive electrode active materials may be used concurrently.

More preferably, $Li(Ni-Mn-Co)O_2$ and those in which a part of these transition metals are substituted with other elements (hereinafter also simply referred to as "NMC composite oxides") are used. The NMC composite oxide has a layered crystal structure in which a lithium atom layer and a transition metal (Mn, Ni and Co are orderly disposed) atom layer are alternately layered via an oxygen atom layer. In addition, the NMC composite oxide contains one Li atom per one transition metal atom, thus the amount of Li that can be taken out is two times that of spinel type lithium manganese oxide, that is, the supply capability is two times and the NMC composite oxide can have a high capacity.

As described above, the NMC composite oxide also includes a composite oxide in which a part of transition metal elements is substituted with other metal elements. Examples of other elements in that case may include Ti, Zr, Nb, W, P, Al, Mg, V, Ca, Sr, Cr, Fe, B, Ga, In, Si, Mo, Y, Sn, V, Cu, Ag, and Zn. Ti, Zr, Nb, W, P, Al, Mg, V, Ca, Sr, and Cr are preferable. Ti, Zr, P, Al, Mg, and Cr are more preferable. Ti, Zr, Al, Mg and Cr are still more preferable from the viewpoint of improving the cycle characteristics.

The NMC composite oxide preferably has a composition represented by the general formula (1): $Li_aNi_bMn_cCo_d$-$M_xO_2$ (where a, b, c, d and x satisfy 0.9≤a≤1.2, 0<b<1, 0<c≤0.5, 0<d≤0.5, and 0≤x≤0.3. M is at least one kind selected from Ti, Zr, Nb, W, P, Al, Mg, V, Ca, Sr and Cr) since the theoretical discharge capacity is high. Here, a represents the atomic ratio of Li, b represents the atomic ratio of Ni, c represents the atomic ratio of Mn, d represents the atomic ratio of Co, and x represents the atomic ratio of M. In the above general formula (1), the relation among b, c and d is not particularly limited and varies depending on the valence of M and the like, but it is preferable to satisfy b+c+d=1. Incidentally, the composition of the respective elements can be measured by, for example, inductively coupled plasma (ICP) atomic emission spectrometry.

It is generally known that nickel (Ni), cobalt (Co) and manganese (Mn) contribute to the capacity and output characteristics from the viewpoint of improving the purity of a material and the electron conductivity. Ti and the like partially substitute the transition metals in the crystal lattice. From the viewpoint of cycle characteristics, a part of the transition elements may be substituted with other metal elements. In this case, it is preferable that 0<x≤0.3 in the general formula (1). It is considered that the crystal structure is stabilized as at least one kind selected from the group consisting of Ti, Zr, Nb, W, P, Al, Mg, V, Ca, Sr and Cr forms a solid solution and, as a result, a decrease in the capacity of the battery can be prevented even when charge and discharge are repeatedly performed and excellent cycle characteristics can be realized.

The NMC composite oxide can be prepared by selecting various known methods such as a coprecipitation method and a spray drying method. It is preferable to use a coprecipitation method since it is easy to prepare the composite oxide. Specifically, nickel-cobalt-manganese composite hydroxide is produced by a coprecipitation method, for example, as the method described in JP 2011-105588 A. Thereafter, the nickel-cobalt-manganese composite hydroxide and a lithium compound are mixed together and calcined, whereby the NMC composite oxide can be obtained.

Incidentally, it goes without saying that positive electrode active materials other than those described above may be used.

The average particle diameter of the positive electrode active material to be contained in the positive electrode active material layer is not particularly limited, but it is preferably from 1 to 100 μm and more preferably from 1 to 25 μm from the viewpoint of high output. Incidentally, in the present specification, the average particle diameter measured by a laser diffraction/scattering method using a particle size distribution measuring apparatus is adopted.

The content (in terms of solid content) of the positive electrode active material in the positive electrode active material layer is preferably from 80% to 99.5% by weight and more preferably from 85% to 99.5% by weight.

The density of the positive electrode active material layer is preferably from 3.0 to 3.7 g/cm³ and more preferably from 3.1 to 3.6 g/cm³ from the viewpoint of high density.

(Binder)

The binder to be used in the positive electrode active material layer is not particularly limited, but examples thereof may include thermoplastic polymers such as polyethylene, polypropylene, polyethylene terephthalate (PET), polyether nitrile, polyacrylonitrile, polyimide, polyamide, cellulose, carboxymethyl cellulose (CMC) and any salt thereof, an ethylene-vinyl acetate copolymer, polyvinyl chloride, styrene-butadiene rubber (SBR), isoprene rubber, butadiene rubber, ethylene-propylene rubber, an ethylene-propylene-diene copolymer, a styrene-butadiene-styrene block copolymer and any hydrogenated product thereof, and a styrene-isoprene-styrene block copolymer and any hydrogenated product thereof; fluorocarbon resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF); vinylidene fluoride-based fluorocarbon rubbers such as vinylidene fluoride-hexafluoropropylene-based fluorocarbon rubber (VDF-HFP-based fluorocarbon rubber), vinylidene fluoride-hexafluoropropylene-tetrafluoroethylene-based fluorocarbon rubber (VDF-HFP-TFE-based fluorocarbon rubber), vinylidene fluoride-pentafluoropropylene-based fluorocarbon rubber (VDF-PFP-based fluorocarbon rubber), vinylidene fluoride-pentafluoropropylene-tetrafluoroethylene-based fluorocarbon rubber (VDF-PFP-TFE-based fluorocarbon rubber), vinylidene fluoride-perfluoromethyl vinyl ether-tetrafluoroethylene-based fluorocarbon rubber (VDF-PFMVE-TFE-based fluorocarbon rubber), and vinylidene fluoride-chlorotrifluoroethylene-based fluorocarbon rubber (VDF-CTFE-based fluorocarbon rubber); and epoxy resins. These binders may be used singly or two or more kinds thereof may be used concurrently.

The amount of the binder to be contained in the positive electrode active material layer is not particularly limited as long as it is an amount in which the active material can be bound, but it is preferably from 0.5% to 15% by weight and more preferably from 1% to 10% by weight with respect to the active material layer.

(Other Additives)

The conductive aid refers to an additive to be compounded for improving the electrical conductivity of the positive electrode active material layer or the negative electrode active material layer. Examples of the conductive aid may include carbon materials such as carbon black such as Ketjen black and acetylene black, graphite, and a carbon fiber. The electronic network inside the active material layer is effectively formed when the active material layer contains a conductive aid, and this can contribute to improvement in output characteristics of the battery.

The amount of the conductive aid to be contained in the positive electrode active material layer is not particularly limited, but it is preferably from 0.5% to 15% by weight and more preferably from 1% to 10% by weight with respect to the active material layer.

Examples of the electrolyte salt (lithium salt) may include $Li(C_2F_5SO_2)_2N$, $LiPF_6$, $LiBF_4$, $LiClO_4$, $LiAsF_6$, and $LiCF_3SO_3$.

Examples of the ion conductive polymer may include polyethylene oxide (PEO)-based polymers and polypropylene oxide (PPO)-based polymers.

The compounding ratio of the components to be contained in the positive electrode active material layer is not particularly limited. The compounding ratio can be adjusted by appropriately referring to known knowledge on the lithium ion secondary batteries.

The thickness of the positive electrode active material layer is also not particularly limited, and conventionally known knowledge on the batteries can be appropriately referred to. As an example, the thickness of the positive electrode active material layer is about from 2 to 100 μm.

[Negative Electrode]

The negative electrode has a negative electrode current collector and a negative electrode active material layer formed on the surface of the negative electrode current collector.

[Negative Electrode Active Material Layer]

The negative electrode active material layer contains a negative electrode active material and further a conductive aid, a binder, an electrolyte (a polymer matrix, an ion conductive polymer, an electrolyte solution, or the like), and other additives such as a lithium salt for enhancing the ion conductivity if necessary. A conductive aid, a binder, an electrolyte (a polymer matrix, an ion conductive polymer, an electrolyte solution, or the like), and other additives such as a lithium salt for enhancing the ion conductivity are the same as those described in the section of the positive electrode active material layer above.

Examples of the negative electrode active material may include carbon materials such as graphite (graphite) such as artificial graphite, coated natural graphite and natural graphite, soft carbon and hard carbon, a lithium-transition metal composite oxide (for example, $Li_4Ti_5O_{12}$), a metal material, and a lithium alloy-based negative electrode material. In some cases, two or more kinds of negative electrode active materials may be used concurrently. Preferably, a carbon material or a lithium-transition metal composite oxide is used as the negative electrode active material from the viewpoint of capacity and output characteristics. Incidentally, it goes without saying that negative electrode active materials other than those described above may be used.

The average particle diameter of the negative electrode active material is not particularly limited, but it is preferably from 1 to 100 μm and more preferably from 1 to 30 μm from the viewpoint of high output.

It is preferable that the negative electrode active material layer contains at least an aqueous binder. An aqueous binder exhibits high binding strength. In addition, there is an advantage that it is possible to greatly diminish the capital investment in the manufacturing line and to achieve a decrease in the environmental burden since water vapor is generated at the time of drying as well as it is easy to procure water as a raw material.

The aqueous binder refers to a binder in which water is used as a solvent or dispersion medium, and specifically it includes a thermoplastic resin, a polymer exhibiting rubber elasticity, a water-soluble polymer and the like or any mixture thereof. Here, a binder in which water is used as a dispersion medium includes all those expressed as latex or emulsion and refers to a polymer, which is emulsified with or suspended in water, and examples thereof may include polymer latexes obtained by emulsion polymerization in a system that self-emulsifies.

Specific examples of the aqueous binder may include styrene-based polymers (styrene-butadiene rubber (SBR), a styrene-vinyl acetate copolymer, a styrene-acrylic copolymer, and the like), acrylonitrile-butadiene rubber, methyl methacrylate-butadiene rubber, (meth)acrylic polymers (polyethyl acrylate, polyethyl methacrylate, polypropyl acrylate, polymethyl methacrylate (methyl methacrylate rubber), polypropyl methacrylate, polyisopropyl acrylate, polyisopropyl methacrylate, polybutyl acrylate, polybutyl methacrylate, polyhexyl acrylate, polyhexyl methacrylate, polyethylhexyl acrylate, polyethylhexyl methacrylate, polylauryl acrylate, polylauryl methacrylate, and the like), polytetrafluoroethylene, polyethylene, polypropylene, an ethylene-propylene copolymer, polybutadiene, butyl rubber, fluorocarbon rubber, polyethylene oxide, polyepichlorohydrin, polyphosphazene, polyacrylonitrile, polystyrene, an ethylene-propylene-diene copolymer, polyvinyl pyridine, chlorosulfonated polyethylene, a polyester resin, a phenol resin, and an epoxy resin: and water-soluble polymers such as polyvinyl alcohol (the average degree of polymerization is suitably from 200 to 4000 and more suitably from 1000 to 3000, the degree of saponification is suitably 80% by mole or more and more suitably 90% by mole or more) and any modified product thereof (a product in which from 1% to 80% by mole of the vinyl acetate units of a copolymer having a molar ratio of ethylene/vinyl acetate=2/98 to 30/70 are saponified, a product in which from 1% to 50% by mole of polyvinyl alcohol is partially acetalized, and the like), starch and any modified product thereof (oxidized starch, phosphorylated starch, cationized starch and the like), cellulose derivatives (carboxymethyl cellulose, methyl cellulose, hydroxypropyl cellulose, hydroxyethyl cellulose, and any salts thereof, and the like), polyvinyl pyrrolidone, polyacrylic acid (salt), polyethylene glycol, copolymers of (meth)acrylamide and/or (meth)acrylic acid salts [a (meth)acrylamide polymer, a (meth)acrylamide-(meth)acrylic acid salt copolymer, a (meth)acrylic acid alkyl (having from 1 to 4 carbon atoms) ester-(meth)acrylic acid salt copolymer, and the like], a styrene-maleic acid salt copolymer, Mannich modified product of polyacrylamide, formalin condensation resins (a urea-formalin resin, a melamine-formalin resin, and the like), a polyamide polyamine or dialkylamine-epichlorohydrin copolymer, polyethyleneimine, casein, soybean protein, synthetic protein, and galactomannan derivatives. One kind of these aqueous binders may be used singly or two or more kinds thereof may be used concurrently.

It is preferable that the aqueous binder contains at least one rubber-based binder selected from the group consisting of styrene-butadiene rubber, acrylonitrile-butadiene rubber, methyl methacrylate-butadiene rubber, and methyl methacrylate rubber from the viewpoint of binding property. Furthermore, the aqueous binder preferably contains styrene-butadiene rubber (SBR) since the binding property is favorable.

In the case of using styrene-butadiene rubber as the aqueous binder, it is preferable to concurrently use the water-soluble polymer from the viewpoint of improving the coating property. Examples of the water-soluble polymer suitable to be concurrently used with styrene-butadiene rubber may include polyvinyl alcohol and any modified product thereof, starch and any modified product thereof, cellulose derivatives (carboxymethyl cellulose (CMC), methyl cellulose, hydroxyethyl cellulose, and any salt thereof, and the like), polyvinyl pyrrolidone, polyacrylic acid (salt), or polyethylene glycol. Among these, it is preferable to combine styrene-butadiene rubber with carboxymethyl cellulose (CMC) (salt) as the binder. The contained weight ratio of the styrene-butadiene rubber to the water-soluble polymer is not particularly limited, and the ratio of styrene-butadiene rubber:water-soluble polymer is preferably 1:0.1 to 10 and more preferably 1:0.3 to 2.

The amount of the binder to be contained in the negative electrode active material layer is not particularly limited as long as it is an amount in which the active material can be bound, but it is preferably from 0.5% to 15% by weight and more preferably from 1% to 10% by weight with respect to the active material layer.

In addition, among the binders to be used in the negative electrode active material layer, the content of the aqueous binder is preferably from 80% to 100% by weight, preferably from 90% to 100% by weight, and preferably 100% by weight.

The compounding ratio of the components to be contained in the negative electrode active material layer is not particularly limited. The compounding ratio can be adjusted by appropriately referring to known knowledge on the lithium ion secondary batteries.

The thickness of the negative electrode active material layer is also not particularly limited, and conventionally known knowledge on the batteries can be appropriately referred to. As an example, the thickness of the negative electrode active material layer is about from 2 to 100 μm and preferably from 40 to 90 μm.

In addition, the density of the negative electrode active material layer is also not particularly limited, but it is, for example, from 1.3 to 1.9 g/cm$^3$ and preferably from 1.4 to 1.8 g/cm$^3$. The coating amount of the negative electrode active material layer is, for example, from 5 to 17 mg/cm$^2$ and preferably from 7 to 15 mg/cm$^2$.

In the non-aqueous electrolyte secondary battery of the present embodiment, it is preferable that the specific surface area of the negative electrode active material layer is 1.5 μm$^2$/g or more. By setting the specific surface area of the negative electrode active material layer to 1.5 μm$^2$/g or more, it is possible to increase the reaction area in the negative electrode active material layer. In other words, the resistance is decreased and the input and output characteristics can be improved since the current density per unit area of the negative electrode active material layer can be decreased. In addition, low temperature durability is improved, and the reaction ununiformity in the electrode plane direction and thickness direction can be decreased. The specific surface area of the negative electrode active material layer is more preferably 1.7 μm$^2$/g or more. The upper limit value of the specific surface area of the negative electrode active material layer is not particularly limited, but it is preferably 5.0 μm$^2$/g or less from the viewpoint of suppressing the irreversible capacity at the initial charge and discharge.

Incidentally, in the present specification, the specific surface area of the negative electrode active material layer is the BET specific surface area (m$^2$/g) to be measured by the nitrogen adsorption method.

The specific surface area of the negative electrode active material layer can be controlled, for example, by appropriately selecting the kind, particle diameter and surface treatment of the negative electrode active material. It is possible to increase the specific surface area by using a negative electrode active material having a small particle diameter. In addition, the specific surface area can be controlled by adjusting the pressing conditions at the time of fabrication of the negative electrode.

[Electrolyte Layer]

The electrolyte layer contains an electrolyte solution in which an electrolyte salt is dissolved, and it is preferable that the electrolyte solution is held in a separator.

The electrolyte solution constituting the electrolyte solution layer has a form in which a lithium salt, which is an electrolyte salt, is dissolved in an organic solvent, which is a plasticizer. Examples of the organic solvent to be used may include carbonates such as ethylene carbonate (EC), propylene carbonate (PC), dimethyl carbonate (DMC), diethyl carbonate (DEC) and ethylmethyl carbonate (EMC). Only one kind of organic solvents may be used singly or two or more kinds thereof may be used concurrently.

As the electrolyte salt, a lithium salt can be used. As the lithium salt, compounds which can be added to the active material layer of an electrode such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$ can be adopted in the same manner. The concentration of the electrolyte salt is not particularly limited, but it is, for example, from 0.2 to 2.0 mol/L, preferably from 0.7 to 1.7 mol/L, and still more preferably from 0.8 to 1.5 mol/L.

The electrolyte solution may further contain additives other than the components described above. Specific examples of such additives may include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methyleneethylene carbonate, and 1,1-dimethyl-2-methylene ethylene carbonate. Among these, vinylene carbonate, methylvinylene carbonate, and vinylethylene carbonate are preferable and vinylene carbonate and vinylethylene carbonate are more preferable. Only one kind of these additives may be used singly or two or more kinds thereof may be used concurrently.

In the non-aqueous electrolyte secondary battery of the present invention, the value obtained by dividing the weight of the electrolyte salt in the pores in the negative electrode active material layer by the weight of the negative electrode active material is 0.031 or more. By securing the optimum amount of the electrolyte salt with respect to the amount of the negative electrode active material in the pores, an optimum number of lithium ion carriers corresponding to the current density is present and the reaction resistance decreases. Hence, lithium ions diffuse to the inside of the negative electrode and thus a difference in reactivity between the surface side and the inside is hardly generated even in a battery having a high density and a high capacity. In addition, the diffusibility of lithium ions in the negative electrode active material layer is sufficiently obtained even in a case in which the battery is a battery having a high capacity, a high density, and a large area and charge and discharge are repeatedly performed at a large current for a short time as a vehicle application, and thus the variation in overvoltage in the plane at the time of charge due to the variation in pore amount of the electrode in the plane is hardly generated. The value obtained by dividing the weight of the electrolyte salt in the pores in the negative electrode active material layer by the weight of the negative electrode active material is preferably 0.033 or more and more preferably 0.034 or more. The upper limit value thereof is not particularly limited, but it is substantially 0.060 or less.

The weight of the electrolyte salt in the pores in the negative electrode active material layer is calculated according to the following calculation formula.

> Weight of electrolyte salt in pores in negative electrode active material layer (g)=pore volume (m$^3$)×concentration of electrolyte salt in electrolyte solution (g/m$^3$)

As the pore volume (m³) of the negative electrode active material layer, the value measured by the following method is used.

Mercury Porosimeter

Name of apparatus: AutoPore IV Model 9510 manufactured by Micromeritics Instrument Corp.

Range of measured pore diameter: ϕ370 μm to 3 nm

Contact angle of mercury: 130°

Surface tension of mercury: 485 dynes/cm

From the data obtained under the above conditions, the pore volume is determined from the volume distribution of the pores corresponding to the pore diameter range of from ϕ10 to 0.01 μm.

The pore volume of the negative electrode active material layer can be controlled by adjusting the coating amount, the pressing temperature and the pressing pressure, and the weight of the electrolyte salt in the pores can be controlled by this.

In the non-aqueous electrolyte secondary battery of the present embodiment, the weight of the electrolyte salt in the pores in the negative electrode active material layer is not particularly limited as long as it is a weight so that the value obtained by dividing the weight of the electrolyte salt in the pores in the negative electrode active material layer by the weight of the negative electrode active material is 0.031 or more.

The weight of the negative electrode active material is determined by measuring the weight of the negative electrode after being coated and dried and then performing calculation according to the following equation.

(Weight of negative electrode active material)=
(weight of negative electrode)−(weight of current collector)−(weight of conductive aid, binder, electrolyte and other additives)

In the non-aqueous electrolyte secondary battery of the present embodiment, the weight of the negative electrode active material is not particularly limited as long as it is a weight so that the value obtained by dividing the weight of the electrolyte salt in the pores in the negative electrode active material layer by the weight of the negative electrode active material is 0.031 or more, but the weight per 1 cm² area of the negative electrode active material layer is, for example, from 6 to 15 g/cm² and preferably from 7.5 to 14 g/cm².

The weight of the negative electrode active material can be adjusted by controlling the composition, coating amount, density, and thickness of the negative electrode active material layer.

Preferably, the Walden product of the electrolyte solution at 0° C. is from $2.5 \times 10^{-6}$ to $3.5 \times 10^{-6}$ Pa·S·m²·mol⁻¹. By setting the Walden product of the electrolyte solution at 0° C. to be in the above range, it is possible to suppress an increase in the viscosity of the electrolyte solution at a low temperature. Hence, the input and output characteristics at a low temperature can be improved. Consequently, the reaction hardly ununiformly takes place in the plane direction and thickness direction of the electrode even at a low temperature, and the durability at a low temperature can be improved. The Walden product (Pa·s·S·m²·mol⁻¹) can be determined according to an equation of Walden product ($10^{-9}$·Pa·s·S·m²·mol⁻¹)=viscosity (mPa·s)×molar conductivity (mS/m·M). The viscosity is determined by measuring the viscosity at a predetermined temperature by a rotational viscosity measuring method. The molar conductivity is determined by molar conductivity=electrical conductivity÷molar concentration, and the electrical conductivity can be determined by immersing an electrically conductive cell in a sample and measuring the electrical conductivity at a predetermined temperature. The Walden product of the electrolyte solution can be adjusted by appropriately selecting the electrolyte salt concentration and the organic solvent.

The separator has a function of holding the electrolyte solution and thus securing the lithium ion conductivity between the positive electrode and the negative electrode and a function as a partition wall between the positive electrode and the negative electrode.

Examples of a form of the separator may include a separator of a porous sheet composed of a polymer or fiber which absorbs and holds the electrolyte solution described above or a nonwoven fabric separator.

As the separator of a porous sheet composed of a polymer or fiber, for example, a microporous (microporous membrane) can be used. Examples of a specific form of the porous sheet composed of a polymer or fiber may include microporous (microporous membrane) separators composed of polyolefins such as polyethylene (PE) and polypropylene (PP); a laminate in which a plurality of these are laminated (for example, a laminate having a three-layer structure of PP/PE/PP), hydrocarbon-based resins such as polyimide, aramid, and polyvinylidene fluoride-hexafluoropropylene (PVdF-HFP), a glass fiber and the like.

The thickness of the microporous (microporous membrane) separator cannot be unambiguously regulated since it varies depending on the intended use. As an example, it is desirable that the thickness of the microporous (microporous membrane) separator is from 4 to 60 μm as a single layer or multiple layers in applications such as a secondary battery for driving a motor of an electric vehicle (EV), a hybrid electric vehicle (HEV), a fuel cell vehicle (FCV) and the like. It is desirable that the micropore diameter of the microporous (microporous membrane) separator is 1 μm or less at maximum (usually, the pore diameter is about several tens of nm).

As the nonwoven fabric separator, conventionally known ones such as cotton, rayon, acetate, nylon, polyester; polyolefins such as PP and PE; polyimide, and aramid are used singly or in mixture. In addition, the bulk density of the nonwoven fabric is not particularly limited as long as sufficient battery characteristics can be obtained by the impregnated electrolyte. Furthermore, the thickness of the nonwoven fabric separator may be the same as that of the electrolyte layer, and it is preferably from 5 to 200 μm and particularly preferably from 10 to 100 μm.

In addition, the separator may be a separator (a separator with a heat resistant insulating layer) in which a heat resistant insulating layer is layered on a porous substrate. The heat resistant insulating layer is a ceramic layer containing inorganic particles and a binder. As the separator with a heat resistant insulating layer, one that has a melting point or thermal softening point of 150° C. or more and preferably 200° C. or more and thus exhibits high heat resistance is used. By having a heat resistant insulating layer, the internal stress, which increases when the temperature rises, of the separator is relieved and it is thus possible to obtain the effect of suppressing thermal shrinkage. As a result, it is possible to prevent induction of short circuit between the electrodes of the battery and thus a battery configuration in which performance deterioration due to temperature rise hardly occurs is obtained. In addition, the mechanical strength of the separator with a heat resistant insulating layer is improved and rupture of the separator hardly occurs as the separator has a heat resistant insulating layer. Furthermore, the separator is hardly curled in the manufacturing process of the battery because of the thermal shrinkage suppressing effect and a high mechanical strength.

The inorganic particles in the heat resistant insulating layer contribute to the mechanical strength and thermal shrinkage suppressing effect of the heat resistant insulating layer. The materials to be used as the inorganic particles are not particularly limited. Examples thereof may include oxides ($SiO_2$, $Al_2O_3$, $ZrO_2$, and $TiO_2$), hydroxides and nitrides of silicon, aluminum, zirconium and titanium, and composites thereof. These inorganic particles may be derived from mineral resources such as boehmite, zeolite, apatite, kaolin, mullite, spinel, olivine, and mica or may be artificially produced. In addition, only one kind of these inorganic particles may be used singly or two or more kinds thereof may be used concurrently. Among these, it is preferable to use silica ($SiO_2$) or alumina ($Al_2O_3$) and it is more preferable to use alumina ($Al_2O_3$) from the viewpoint of cost.

The basis weight of the inorganic particles is not particularly limited, but it is preferably from 5 to 15 g/m². It is preferable that the basis weight is in this range from the viewpoint of obtaining sufficient ion conductivity and maintaining the heat resistant strength.

The binder in the heat resistant insulating layer plays a role of bonding the inorganic particles to each other and the inorganic particles to the porous resin substrate layer. By this binder, a heat resistant insulating layer is stably formed and peeling off between the porous substrate layer and the heat resistant insulating layer is prevented.

The binder to be used in the heat resistant insulating layer is not particularly limited, and it is possible to use, for example, compounds such as carboxymethyl cellulose (CMC), polyacrylonitrile, cellulose, an ethylene-vinyl acetate copolymer, polyvinyl chloride, styrene-butadiene rubber (SBR), isoprene rubber, butadiene rubber, polyvinylidene fluoride (PVdF), polytetrafluoroethylene (PTFE), polyvinyl fluoride (PVF), and methyl acrylate as the binder. Among these, it is preferable to use carboxymethyl cellulose (CMC), methyl acrylate, or polyvinylidene fluoride (PVdF). Only one kind of these compounds may be used singly or two or more kinds thereof may be used concurrently.

The content of the binder in the heat resistant insulating layer is preferably from 2% to 20% by weight with respect to 100% by weight of the heat resistant insulating layer. When the content of the binder is 2% by weight or more, it is possible to enhance the peeling strength between the heat resistant insulating layer and the porous substrate layer and to improve the vibration resistance of the separator. On the other hand, the gaps between the inorganic particles are properly kept when the content of the binder is 20% by weight or less, and it is thus possible to secure sufficient lithium ion conductivity.

It is preferable that the thermal shrinkage of the separator with a heat resistant insulating layer is 10% or less in both MD and TD after the separator is held under the conditions of 150° C. and 2 gf/cm² for 1 hour. By using such a material exhibiting high heat resistance, it is possible to effectively prevent shrinkage of the separator even when the amount of heat generated in the positive electrode increases and the internal temperature of the battery reaches 150° C. As a result, it is possible to prevent the induction of short circuit between the electrodes of the battery and thus a battery configuration in which performance deterioration due to temperature rise hardly occurs is obtained.

[Positive Electrode Current Collecting Plate and Negative Electrode Current Collecting Plate]

The materials constituting the current collecting plates (25 and 27) are not particularly limited, and known highly conductive materials, which have been conventionally used as current collecting plates for lithium ion secondary batteries, can be used. As the constituent materials of the current collecting plates, metal materials such as aluminum, copper, titanium, nickel, stainless steel (SUS), and any alloy thereof are preferable. Aluminum and copper are more preferable and aluminum is particularly preferable from the viewpoint of light weight, corrosion resistance and high conductivity. Incidentally, the same material or different materials may be used in the positive electrode current collecting plate 27 and the negative electrode current collecting plate 25.

[Positive Electrode Lead and Negative Electrode Lead]

In addition, the current collector 11 may be electrically connected to the current collecting plates (25 and 27) via a positive electrode lead and a negative electrode lead although it is not illustrated. As constituent materials of the positive electrode lead and negative electrode lead, the materials to be used in known lithium ion secondary batteries can be adopted in the same manner. Incidentally, it is preferable that the part taken out from the outer casing is covered with a heat-shrinkable tube exhibiting heat resistance and insulation property or the like so as not to come into contact with peripheral devices, wires and the like, to cause a leak of electricity, and thus to affect the products (for example, automotive parts, particularly electronic devices, and the like).

[Battery Outer Casing Body]

As a battery outer casing body 29, a known metal can case can be used and also a bag-like case which is formed of a laminate film containing aluminum and can cover the power generating element can be used. As the laminate film, for example, a laminate film having a three-layer structure formed by laminating PP, aluminum, and nylon in this order can be used, but it is not limited thereto at all. A laminate film is desirable from the viewpoint of exhibiting a high output and excellent cooling performance and being able to be suitably utilized in batteries for large-sized devices for EV and HEV and an aluminum laminate film is more preferable from the viewpoint of weight saving.

[Ratio of Rated Capacity to Pore Volume of Negative Electrode Active Material Layer]

In the non-aqueous electrolyte secondary battery of the present embodiment, the ratio of the rated capacity to the pore volume of the negative electrode active material layer is 1.12 Ah/cc or more. The ratio of the capacity to the pore volume of the negative electrode active material layer is an index which indicates the highness of capacity density of the negative electrode active material layer. Here, the density of the negative electrode active material itself is required to be taken into consideration in g/cc to denote the density of the active material in the negative electrode active material layer. For example, in a material in which the density of the active material is low, the density of the negative electrode active material layer is lower than that of the material in which the density of the active material is high even when the same amount of the active material is filled in the same volume, and it is thus impossible to grasp whether the density is low or the weight of the negative electrode active material is small. For this reason, in the present specification, the capacity per pore volume is specified and used as an index of the highness of capacity density. Furthermore, the ratio becomes an index of the density indicating to what extent the negative electrode active material is filled without gaps by specifying the capacity per pore volume. Furthermore, the volume of the pores in which the electrolyte solution, which is a pathway through which lithium ions move at the time of charge and discharge, is present becomes an index of the diffusibility of lithium ions.

In addition, Li ions in the negative electrode active material layer are increased as the capacity of the battery is increased, but the diffusibility of Li ions decreases when the volume of the pores in the negative electrode active material layer decreases. Consequently, the ratio of the capacity to the pore volume of the negative electrode is an index of the diffusibility of Li ions, and the cycle characteristics are remarkably improved by setting the proportion of the weight of the electrolyte salt to the weight of the negative electrode active material to 0.031 or more, even under the environment in which the ratio of the rated capacity to the pore volume of the negative electrode active material layer is 1.12 Ah/cc or more and thus the diffusibility of Li ions is low.

The upper limit of the ratio of the rated capacity to the pore volume of the negative electrode active material layer is not particularly limited, but the ratio of the rated capacity to the pore volume of the negative electrode active material is, for example, 2.00 Ah/cc or less, preferably 1.80 Ah/cc or less, and more preferably 1.70 Ah/cc or less when the diffusibility of Li ions is taken into consideration. In addition, the ratio is preferably 1.20 Ah/cc or more from the viewpoint of increasing the density, and the ratio is more preferably 1.40 Ah/cc or more since the effect of the present invention is more likely to be exerted.

The rated capacity is measured at a temperature of 25° C. in a predetermined voltage range according to the following procedures 1 and 2.

Procedure 1: after the upper limit voltage is attained by constant current charge at 0.2 C, the battery is charged by constant voltage charge for 2.5 hours and then pauses for 10 seconds.

Procedure 2: after the lower limit voltage is attained by constant current discharge at 0.2 C, the battery pauses for 10 seconds.

Rated capacity: the discharge capacity (CC discharge capacity) at the time of the constant current discharge in the procedure 2 is taken as the rated capacity.

[Ratio of Battery Area to Rated Capacity and Rated Capacity]

In a general electric vehicle, the battery storage space is about 170 L. The ordinary cell storage space efficiency is about 50% since the cell and auxiliary machines such as a charge and discharge control device are stored in this space. The loading efficiency of the cell into this space is a factor that dominates the cruising distance of the electric vehicle. As the size of the unit cell is smaller, the loading efficiency is impaired and thus the cruising distance cannot be secured.

Hence, in the present invention, it is preferable that the battery structure in which the power generating element is covered with an outer casing body is large. In addition, the effect of the present invention is exerted in a large-sized battery as described above. Specifically, in the present embodiment, an increase in size of the battery is specified from the relation between the battery area and the battery capacity. Specifically, in the non-aqueous electrolyte secondary battery according to the present embodiment, the value of the ratio of the battery area to the rated capacity is 4.0 $cm^2$/Ah or more. In the present invention, the battery area is necessarily as large as 120 $cm^2$ or more since the rated capacity is as large as 30 Ah or more. It is more preferable as the ratio of the battery area to the rated capacity is larger from the viewpoint of high capacity, but the ratio is usually 18 $cm^2$/Ah or less because of the in-vehicle volume. The value of the ratio of the battery area to the rated capacity is preferably from 5.0 to 15 $cm^2$/Ah. The ratio of the battery area to the rated capacity is preferably 15 $cm^2$/Ah or less and more preferably 10 $cm^2$/Ah or less from the viewpoint of increasing the density.

Here, the battery area refers to the area (in the plane direction) of the positive electrode. The largest positive electrode area is taken as the battery area in a case in which there are a plurality of positive electrodes and the areas thereof are different from one another.

In the present embodiment, the rated capacity is 30 Ah or more. In the case of a battery having a large area and a large capacity so that the value of the ratio of the battery area to the rated capacity is 4.0 $cm^2$/Ah or more and the rated capacity is 30 Ah or more, it is more difficult to maintain a high capacity by repeated charge and discharge cycles and the problem of improvement in cycle characteristics can still more remarkably arise. On the other hand, in batteries which do not have a large area and a large capacity as described above, for example, the conventional consumer type batteries, the occurrence of such a problem is hardly actualized (Comparative Examples 7 and 8 to be described later). It is more preferable as the rated capacity is larger, and the upper limit thereof is not particularly limited, but it is usually 100 Ah or less. The rated capacity is preferably from 30 to 70 Ah, more preferably from 40 to 60 Ah, and more preferably from 50 to 60 Ah. Incidentally, as the rated capacity, the value measured by the method to be described in the following Examples is adopted.

In addition, as the physical size of the electrode, it is preferable that the length of the short side of the battery is 100 mm or more. Such a large-sized battery can be used in a vehicle application. Here, the length of the short side of the battery refers to the side having the shortest length. The upper limit of the length of the short side is not particularly limited, but it is usually 400 mm or less. Incidentally, the size of the electrode is defined as the size of the positive electrode.

Furthermore, the aspect ratio of the rectangular electrode is preferably from 1 to 3 and more preferably 1 to 2. Incidentally, the aspect ratio of the electrode is defined as the aspect ratio of the rectangular positive electrode active material layer. There is an advantage that the performance requirements for vehicles and the mounting space can be both attained by setting the aspect ratio to be in such a range.

[Assembled Battery]

An assembled battery is one constituted by connecting a plurality of batteries. More specifically, it is one constituted by connecting at least two or more batteries in series, in parallel, or in series and parallel. It is possible to freely adjust the capacity and the voltage by connecting the batteries in series and in parallel.

It is also possible to form a compact assembled battery, which can be attached and detached, by connecting a plurality of batteries in series or in parallel. Moreover, it is also possible to form an assembled battery having a large capacity and a high output which are suitable for a power source for driving a vehicle or an auxiliary power source to be demanded to have a high volumetric energy density and a high volumetric output density by further connecting a plurality of these compact assembled batteries, which can be attached and detached, in series or in parallel. The number of batteries to be connected to fabricate an assembled battery or the number of steps of compact assembled batteries to be stacked to fabricate a large capacity assembled battery may be determined depending on the battery capacity and output of the vehicle (electric vehicle) on which the battery is mounted.

A cell unit in which a plurality of batteries are stacked in this manner may be housed in upper and lower cases (for example, metal cases) to form an assembled battery. At this time, usually the assembled battery is stored in the case as the metal case is fastened by the fastening member. Consequently, the battery is pressurized in the stacked direction in the case. It is considered that in-plane pressure distribution is likely to be generated in large-sized batteries by such pressurization but, according to the configuration of the present embodiment, the variation in porosity in the positive electrode active material is small and thus the concentration of current due to the pressure distribution can be relieved.

[Vehicle]

The non-aqueous electrolyte secondary battery of the present embodiment exhibits favorable cycle characteristics as the discharge capacity thereof is maintained even when being used for a long period of time. In vehicle applications such as electric vehicles, hybrid electric vehicles, fuel cell vehicles and hybrid fuel cell vehicles, a long life span is required as well as a high capacity and a large size are demanded as compared with electric and mobile electronic devices applications. Consequently, the non-aqueous electrolyte secondary battery described above can be suitably utilized as a power source for a vehicle, for example, as a power source for driving a vehicle or an auxiliary power source.

Specifically, a battery or an assembled battery formed by combining a plurality of these can be mounted on a vehicle. In the present embodiment, it is possible to constitute a battery, which has a long life span and exhibits excellent long-term reliability and output characteristics, and it is thus possible to constitute a plug-in hybrid electric vehicle with a long EV mileage and an electric vehicle with a long single charge mileage by mounting such a battery. This is because a highly reliable vehicle with a long life span is obtained by using the battery or an assembled battery constituted by combining a plurality of these in, for example, hybrid vehicles, fuel cell vehicles, and electric vehicles (each including two-wheeled vehicles (motorcycles) and three-wheeled vehicles in addition to four☐wheeled vehicles (passenger vehicles, commercial vehicles such as trucks and buses, light vehicles, and the like) in the case of motor vehicles. However, the application is not limited to motor vehicles, but, for example, the battery can be applied as various kinds of power sources of other vehicles, for example, mobile bodies such as electric trains and can be utilized as a power source for placing such as an uninterruptible power supply.

EXAMPLES

The effect of the present invention will be described with reference to the following Examples and Comparative Examples. In Examples, the notation of "parts" or "%" may be used in some cases, and this represents "parts by weight" or "% by weight" unless otherwise stated. In addition, the respective operations are performed at room temperature (25° C.) unless otherwise stated.

Example 1

1. Fabrication of Electrolyte Solution

A mixed solvent (30:30:40 (volume ratio)) of ethylene carbonate (EC), ethyl methyl carbonate (EMC) and diethyl carbonate (DEC) was used as a solvent. $LiPF_6$ was used as an electrolyte salt (lithium salt). Furthermore, vinylene carbonate was added thereto at 2.0% by weight with respect to the total weight, thereby fabricating an electrolyte solution. The concentration of $LiPF_6$ was adjusted so that the value obtained by dividing the weight of $LiPF_6$ in the electrolyte solution in the pores in the negative electrode by the weight of the negative electrode active material per unit cell was 0.033. The Walden product of this electrolyte solution at 0° C. was $2.9 \times 10^{-6}$ Pa·s·S·m²·mol⁻¹.

2. Fabrication of Positive Electrode

A solid component composed of 90% by weight of $LiNi_{1/3}Mn_{1/3}Co_{1/3}O_2$ (average particle diameter: 15 μm) as a positive electrode active material, 5% by weight of acetylene black as a conductive aid and 5% by weight of PVdF as a binder was prepared. An appropriate amount of N-methyl-2-pyrrolidone (NMP) of a slurry viscosity adjusting solvent was added to this solid component to fabricate a positive electrode slurry composition. Next, the positive electrode slurry composition was coated on both sides of an aluminum foil (thickness: 20 μm) of a current collector and drying and pressing were performed, thereby fabricating a positive electrode in which the density of the positive electrode active material layer was 3.4 g/cm³ and the coating amount on one side of the positive electrode active material layer was 15.0 mg/cm².

3. Fabrication of Negative Electrode

A solid component composed of 94% by weight of natural graphite (average particle diameter: 20 μm) as a negative electrode active material, 2% by weight of acetylene black as a conductive aid, and 3% by weight of styrene-butadiene rubber (SBR) and 1% by weight of carboxymethyl cellulose (CMC) as a binder was prepared. An appropriate amount of ion-exchanged water of a slurry viscosity adjusting solvent was added to this solid component to fabricate a negative electrode active material slurry composition. Next, the negative electrode active material slurry composition was coated on both sides of a copper foil (10 μm) of a current collector and drying and pressing were performed, thereby fabricating a negative electrode in which the density of the negative electrode active material layer was 1.5 g/cm³ and the coating amount on one side was 7.3 mg/cm². The specific surface area of the negative electrode active material layer was 1.7 μm²/g.

4. Completion Process of Unit Cell

The positive electrode thus fabricated was cut into a rectangular shape of 200 mm×204 mm and the negative electrode was cut into a rectangular shape of 205 mm×209 mm (24 positive electrodes and 25 negative electrodes). These positive electrodes and negative electrodes were alternately layered via a 210 mm×214 mm separator (microporous polypropylene membrane, thickness: 25 μm, porosity: 55%), thereby fabricating a power generating element.

A tab was welded to the power generating element obtained, and the power generating element was hermetically sealed in an outer casing formed of an aluminum laminate film together with the electrolyte solution, thereby completing a battery. Thereafter, the battery was sandwiched between urethane rubber sheets (thickness: 3 mm) larger than the electrode area and further Al plates (thickness: 5 mm) and appropriately pressurized in the stacked direction from both sides. Thereafter, the battery thus obtained was subjected to the initial charge over 5 hours (upper limit voltage: 4.15 V) and then to aging at 45° C. for 5 days for degassing and discharge, whereby the battery of the present Example was completed. The rated capacity (cell capacity)

of the battery thus fabricated was 40 Ah, and the ratio of the battery area to the rated capacity was 10.2 cm$^2$/Ah. In addition, the ratio of the rated capacity to the pore volume of the negative electrode active material layer was 1.12 Ah/cc.

In the battery fabricated in Example 1, the value obtained by dividing the weight of the electrolyte salt in the pores in the negative electrode active material layer by the weight of the negative electrode active material was 0.033.

Incidentally, the rated capacity of the battery was obtained as follows.

<<Measurement of Rated Capacity>>

The rated capacity is measured at a temperature of 25° C. in a voltage range of from 3.0 V to 4.15 V according to the following procedures 1 and 2.

Procedure 1: after the voltage reaches 4.15 V by constant current charge at 0.2 C, the battery is charged by constant voltage charge for 2.5 hours and then pauses for 10 seconds.

Procedure 2: after the voltage reaches 3.0 V by constant current discharge at 0.2 C, the battery pauses for 10 seconds.

Rated capacity: the discharge capacity (CC discharge capacity) at the time of the constant current discharge in the procedure 2 was taken as the rated capacity.

Example 2

An electrolytic solution was prepared so that the Walden product thereof at 0° C. was $3.2 \times 10^{-6}$ Pa·S·m$^2$·mol$^{-1}$ in Example 1. Furthermore, the density of the negative electrode active material layer, the coating amount on one side of the negative electrode active material layer, the density of the positive electrode active material layer, and the coating amount on one side of the positive electrode active material layer were appropriately adjusted, thereby obtaining a non-electrolyte secondary battery presented in Table 1.

The rated capacity (cell capacity) of the battery was 40 Ah, and the value of the ratio of the battery area to the rated capacity was 10.2 cm$^2$/Ah. In addition, the ratio of the rated capacity to the pore volume of the negative electrode active material layer was 1.12 Ah/cc. The value obtained by dividing the weight of the electrolyte salt in the pores in the negative electrode active material layer by the weight of the negative electrode active material was 0.041. The specific surface area of the negative electrode active material layer was 1.7 µm$^2$/g.

Example 3

The density of the negative electrode active material layer, the coating amount on one side of the negative electrode active material layer, the density of the positive electrode active material layer, and the coating amount on one side of the positive electrode active material layer were appropriately adjusted in Example 2, thereby obtaining a non-electrolyte secondary battery presented in Table 1.

The specific surface area of the negative electrode active material layer was 2.2 µm$^2$/g. The rated capacity (cell capacity) of the battery was 50 Ah, and the value of the ratio of the battery area to the rated capacity was 8.4 cm$^2$/Ah. In addition, the ratio of the rated capacity to the pore volume of the negative electrode active material layer was 1.25 Ah/cc. The value obtained by dividing the weight of the electrolyte salt in the pores in the negative electrode active material layer by the weight of the negative electrode active material was 0.038.

Example 4

The density of the negative electrode active material layer, the coating amount on one side of the negative electrode active material layer, the density of the positive electrode active material layer, and the coating amount on one side of the positive electrode active material layer were appropriately adjusted in Example 2, thereby obtaining a non-electrolyte secondary battery presented in Table 1.

The specific surface area of the negative electrode active material layer was 2.6 µm$^2$/g. The rated capacity (cell capacity) of the battery was 60 Ah, and the value of the ratio of the battery area to the rated capacity was 7.0 cm$^2$/Ah. In addition, the ratio of the rated capacity to the pore volume of the negative electrode active material layer was 1.65 Ah/cc. The value obtained by dividing the weight of the electrolyte salt in the pores in the negative electrode active material layer by the weight of the negative electrode active material was 0.035.

Example 5

An electrolytic solution was prepared so that the Walden product thereof at 0° C. was $3.6 \times 10^{-6}$ Pa·S·m$^2$·mol$^{-1}$ in Example 1. Furthermore, the density of the negative electrode active material layer, the coating amount on one side of the negative electrode active material layer, the density of the positive electrode active material layer, and the coating amount on one side of the positive electrode active material layer were appropriately adjusted, thereby obtaining a non-electrolyte secondary battery presented in Table 1.

The specific surface area of the negative electrode active material layer was 1.7 µm$^2$/g. The rated capacity (cell capacity) of the battery was 40 Ah, and the value of the ratio of the battery area to the rated capacity was 10.2 cm$^2$/Ah. In addition, the ratio of the rated capacity to the pore volume of the negative electrode active material layer was 1.12 Ah/cc. The value obtained by dividing the weight of the electrolyte salt in the pores in the negative electrode active material layer by the weight of the negative electrode active material was 0.048.

Example 6

The density of the negative electrode active material layer, the coating amount on one side of the negative electrode active material layer, the density of the positive electrode active material layer, and the coating amount on one side of the positive electrode active material layer were appropriately adjusted in Example 5, thereby obtaining a non-electrolyte secondary battery presented in Table 1.

The specific surface area of the negative electrode active material layer was 2.2 µm$^2$/g. The rated capacity (cell capacity) of the battery was 50 Ah, and the value of the ratio of the battery area to the rated capacity was 8.4 cm$^2$/Ah. In addition, the ratio of the rated capacity to the pore volume of the negative electrode active material layer was 1.25 Ah/cc. The value obtained by dividing the weight of the electrolyte salt in the pores in the negative electrode active material layer by the weight of the negative electrode active material was 0.045.

Example 7

The density of the negative electrode active material layer, the coating amount on one side of the negative electrode active material layer, the density of the positive electrode active material layer, and the coating amount on one side of the positive electrode active material layer were appropriately adjusted in Example 5, thereby obtaining a non-electrolyte secondary battery presented in Table 1.

The specific surface area of the negative electrode active material layer was 2.6 m2/g. The rated capacity (cell capacity) of the battery was 60 Ah, and the value of the ratio of the battery area to the rated capacity was 7.0 cm$^2$/Ah. In addition, the ratio of the rated capacity to the pore volume of the negative electrode active material layer was 1.65 Ah/cc. The value obtained by dividing the weight of the electrolyte salt in the pores in the negative electrode active material layer by the weight of the negative electrode active material was 0.041.

Example 8

The density of the negative electrode active material layer, the coating amount on one side of the negative electrode active material layer, the density of the positive electrode active material layer, and the coating amount on one side of the positive electrode active material layer were appropriately adjusted in Example 1, thereby obtaining a non-electrolyte secondary battery presented in Table 1.

The specific surface area of the negative electrode active material layer was 1.3 m2/g. The rated capacity (cell capacity) of the battery was 40 Ah, and the value of the ratio of the battery area to the rated capacity was 10.2 cm$^2$/Ah. In addition, the ratio of the rated capacity to the pore volume of the negative electrode active material layer was 1.12 Ah/cc. The value obtained by dividing the weight of the electrolyte salt in the pores in the negative electrode active material layer by the weight of the negative electrode active material was 0.033.

Example 9

An electrolyte solution was prepared so that the Walden product thereof at 0° C. was 3.1×10$^{-6}$ Pa·s·S·m$^2$·mol$^{-1}$ in Example 1. Furthermore, the density of the negative electrode active material layer, the coating amount on one side of the negative electrode active material layer, the density of the positive electrode active material layer, and the coating amount on one side of the positive electrode active material layer were appropriately adjusted, thereby obtaining a non-electrolyte secondary battery presented in Table 1.

The specific surface area of the negative electrode active material layer was 2.6 μm$^2$/g. The rated capacity (cell capacity) of the battery was 60 Ah, and the value of the ratio of the battery area to the rated capacity was 7.0 cm$^2$/Ah. In addition, the ratio of the rated capacity to the pore volume of the negative electrode active material layer was 1.65 Ah/cc. The value obtained by dividing the weight of the electrolyte salt in the pores in the negative electrode active material layer by the weight of the negative electrode active material was 0.032.

Comparative Example 1

The density of the negative electrode active material layer, the coating amount on one side of the negative electrode active material layer, the density of the positive electrode active material layer, and the coating amount on one side of the positive electrode active material layer were appropriately adjusted in Example 1, thereby obtaining a non-electrolyte secondary battery presented in Table 1.

The value obtained by dividing the weight of the electrolyte salt in the pores in the negative electrode active material layer by the weight of the negative electrode active material was 0.030.

The specific surface area of the negative electrode active material layer was 2.2 μm$^2$/g. The rated capacity (cell capacity) of the battery was 50 Ah, and the value of the ratio of the battery area to the rated capacity was 8.4 cm$^2$/Ah. In addition, the ratio of the rated capacity to the pore volume of the negative electrode active material layer was 1.25 Ah/cc.

Comparative Example 2

The density of the negative electrode active material layer, the coating amount on one side of the negative electrode active material layer, the density of the positive electrode active material layer, and the coating amount on one side of the positive electrode active material layer were appropriately adjusted in Example 1, thereby obtaining a non-electrolyte secondary battery presented in Table 1.

The specific surface area of the negative electrode active material layer was 2.6 m$^2$/g. The value obtained by dividing the weight of the electrolyte salt in the pores in the negative electrode active material layer by the weight of the negative electrode active material was 0.027.

The rated capacity (cell capacity) of the battery was 60 Ah, and the value of the ratio of the battery area to the rated capacity was 7.0 cm$^2$/Ah. In addition, the ratio of the rated capacity to the pore volume of the negative electrode active material layer was 1.65 Ah/cc.

Comparative Example 3

An electrolyte solution was prepared so that the Walden product thereof at 0° C. was 2.7×10$^{-6}$ Pa·s·S·m$^2$·mol$^{-1}$ in Example 1. Furthermore, the density of the negative electrode active material layer, the coating amount on one side of the negative electrode active material layer, the density of the positive electrode active material layer, and the coating amount on one side of the positive electrode active material layer were appropriately adjusted, thereby obtaining a non-electrolyte secondary battery presented in Table 1.

The specific surface area of the negative electrode active material layer was 1.7 μm$^2$/g. The rated capacity (cell capacity) of the battery was 40 Ah, and the value of the ratio of the battery area to the rated capacity was 10.2 cm$^2$/Ah. In addition, the ratio of the rated capacity to the pore volume of the negative electrode active material layer was 1.12 Ah/cc. The value obtained by dividing the weight of the electrolyte salt in the pores in the negative electrode active material layer by the weight of the negative electrode active material was 0.027.

Comparative Example 4

The density of the negative electrode active material layer, the coating amount on one side of the negative electrode active material layer, the density of the positive electrode active material layer, and the coating amount on one side of the positive electrode active material layer were appropriately adjusted in Comparative Example 3, thereby obtaining a non-electrolyte secondary battery presented in Table 1.

The value obtained by dividing the weight of the electrolyte salt in the pores in the negative electrode active material layer by the weight of the negative electrode active material was 0.025.

The specific surface area of the negative electrode active material layer was 2.2 μm$^2$/g. The rated capacity (cell capacity) of the battery was 50 Ah, and the value of the ratio of the battery area to the rated capacity was 8.4 cm$^2$/Ah. In addition, the ratio of the rated capacity to the pore volume of the negative electrode active material layer was 1.25 Ah/cc.

Comparative Example 5

The density of the negative electrode active material layer, the coating amount on one side of the negative electrode active material layer, the density of the positive electrode active material layer, and the coating amount on one side of the positive electrode active material layer were appropriately adjusted in Comparative Example 3, thereby obtaining a non-electrolyte secondary battery presented in Table 1.

The value obtained by dividing the weight of the electrolyte salt in the pores in the negative electrode active material layer by the weight of the negative electrode active material was 0.022.

The specific surface area of the negative electrode active material layer was 2.6 µm²/g. The rated capacity (cell capacity) of the battery was 60 Ah, and the value of the ratio of the battery area to the rated capacity was 7.0 cm²/Ah. In addition, the ratio of the rated capacity to the pore volume of the negative electrode active material layer was 1.65 Ah/cc.

Comparative Example 6

The density of the negative electrode active material layer, the coating amount on one side of the negative electrode active material layer, the density of the positive electrode active material layer, and the coating amount on one side of the positive electrode active material layer were appropriately adjusted in Comparative Example 3, thereby obtaining a non-electrolyte secondary battery presented in Table 1.

The specific surface area of the negative electrode active material layer was 1.8 µm²/g. The rated capacity (cell capacity) of the battery was 30 Ah, and the value of the ratio of the battery area to the rated capacity was 14.0 cm²/Ah. In addition, the ratio of the rated capacity to the pore volume of the negative electrode active material layer was 1.01 Ah/cc. The value obtained by dividing the weight of the electrolyte salt in the pores in the negative electrode active material layer by the weight of the negative electrode active material was 0.028.

Comparative Example 7

The density of the negative electrode active material layer, the coating amount on one side of the negative electrode active material layer, the density of the positive electrode active material layer, and the coating amount on one side of the positive electrode active material layer were appropriately adjusted in Comparative Example 3. The specific surface area of the negative electrode active material layer was 1.8 µm²/g.

The size of the positive electrode was changed to 80 mm×132 mm, the negative electrode was changed to 85 mm×137 mm, and the number of layers was changed from 24 layers to 35 layers.

The specific surface area of the negative electrode active material layer was 1.8 µm²/g. The rated capacity (cell capacity) of the battery was 27 Ah, and the value of the ratio of the battery area to the rated capacity was 3.9 cm²/Ah. In addition, the ratio of the rated capacity to the pore volume of the negative electrode active material layer was 1.25 Ah/cc. The value obtained by dividing the weight of the electrolyte salt in the pores in the negative electrode active material layer by the weight of the negative electrode active material was 0.028.

(Cycle Characteristics)

The battery fabricated in each of Examples and Comparative Examples was charged to a cut-off voltage of 4.15 V by setting the current density with respect to the positive electrode to 2 mA/cm² to obtain the initial charge capacity, the battery paused for 1 hour, and then the capacity when the battery was discharged to the cut-off voltage of 3.0 V was taken as the initial discharge capacity. This charge and discharge cycle was repeated 500 times. The proportion of the discharge capacity at the 500th cycle to the initial discharge capacity was taken as the capacity retention rate (%) and evaluated as cycle durability.

(Input and Output Characteristics)

For the battery fabricated in each of Examples and Comparative Examples, the SOC was adjusted to 50% at 25° C., and then discharge was performed at 1 C for 20 seconds in a state in which the temperature of the battery reached 0° C., and the direct current resistance (DCR, ohm) was measured. The results are expressed as the relative values when the value for the battery fabricated in Example 1 was taken as 100.

The conditions and the results on the input and output characteristics and cycle characteristics for each of Examples and Comparative Examples are presented in the following Table 1.

TABLE 1

| | Weight of electrolyte salt in pores in negative electrode active material layer/weight of negative electrode active material | Walden product of electrolyte solution (×10⁻⁶ Pa · s · S · m² · mol⁻¹) | Specific surface area of negative electrode active material layer (m²/g) | Battery area/rated capacity (cm²/Ah) | Rated capacity (Ah) | Rated capacity/pore volume of negative electrode active material layer (Ah/cc) | Capacity retention rate (%) | 0° C. DCR(a.u.) |
|---|---|---|---|---|---|---|---|---|
| Example 1 | 0.033 | 2.9 | 1.7 | 10.2 | 40 | 1.12 | 94 | 100 |
| Example 2 | 0.041 | 3.2 | 1.7 | 10.2 | 40 | 1.12 | 95 | 102 |
| Example 3 | 0.038 | 3.2 | 2.2 | 8.4 | 50 | 1.25 | 94 | 102 |
| Example 4 | 0.035 | 3.2 | 2.6 | 7.0 | 60 | 1.65 | 94 | 102 |
| Example 5 | 0.048 | 3.6 | 1.7 | 10.2 | 40 | 1.12 | 94 | 115 |
| Example 6 | 0.045 | 3.6 | 2.2 | 8.4 | 50 | 1.25 | 93 | 115 |
| Example 7 | 0.041 | 3.6 | 2.6 | 7.0 | 60 | 1.65 | 93 | 115 |
| Example 8 | 0.033 | 2.9 | 1.3 | 10.2 | 40 | 1.12 | 93 | 108 |
| Example 9 | 0.032 | 3.1 | 2.6 | 7.0 | 60 | 1.65 | 92 | 101 |
| Comparative Example 1 | 0.030 | 2.9 | 2.2 | 8.4 | 50 | 1.25 | 87 | 100 |
| Comparative Example 2 | 0.027 | 2.9 | 2.6 | 7.0 | 60 | 1.65 | 85 | 100 |
| Comparative Example 3 | 0.027 | 2.7 | 1.7 | 10.2 | 40 | 1.12 | 88 | 98 |

TABLE 1-continued

|  | Weight of electrolyte salt in pores in negative electrode active material layer/weight of negative electrode active material | Walden product of electrolyte solution (×10$^{-6}$ Pa·s·S·m$^2$·mol$^{-1}$) | Specific surface area of negative electrode active material layer (m$^2$/g) | Battery area/rated capacity (cm$^2$/Ah) | Rated capacity (Ah) | Rated capacity/pore volume of negative electrode active material layer (Ah/cc) | Capacity retention rate (%) | 0° C. DCR(a.u.) |
|---|---|---|---|---|---|---|---|---|
| Comparative Example 4 | 0.025 | 2.7 | 2.2 | 8.4 | 50 | 1.25 | 87 | 98 |
| Comparative Example 5 | 0.022 | 2.7 | 2.6 | 7.0 | 60 | 1.65 | 85 | 98 |
| Comparative Example 6 | 0.028 | 2.7 | 1.8 | 14.0 | 30 | 1.01 | 92 | 98 |
| Comparative Example 7 | 0.028 | 2.7 | 1.8 | 3.9 | 27 | 1.25 | 92 | 98 |

From the above results, it can be seen that flat stacked type batteries having a high density, a high capacity, and a large area exhibit excellent cycle characteristics since an optimum concentration of electrolyte salt with respect to the current density of the negative electrode can be secured in the pores in the negative electrode active material in the non-aqueous electrolyte secondary batteries of Examples. Particularly, in the batteries of Examples 1 to 4 and 9 in which the Walden product of the electrolyte solution at 0° C. is in a range of from 2.5×10$^{-6}$ to 3.5×10$^{-6}$ Pa·s·S·m$^2$·mol$^{-1}$, an increase in viscosity of the electrolyte solution at a low temperature can be suppressed and the input and output characteristics at a low temperature can be improved.

On the other hand, in the batteries of Comparative Examples 5 and 6 in which the ratio of the rated capacity to the pore volume of the negative electrode active material layer is 1.12 Ah/cc or more, the ratio of the battery area to the rated capacity is less than 4.0 cm$^2$/Ah, or the rated capacity is less than 30 Ah, the durability and the input and output performance are not affected even in a case in which the value obtained by dividing the weight of the electrolyte salt in the pores in the negative electrode active material layer by the weight of the negative electrode active material is smaller than 0.031. Hence, it can be seen that the cycle characteristics are remarkably improved by setting the value obtained by dividing the weight of the electrolyte salt in the pores by the weight of the negative electrode active material to 0.031 or more in batteries having a high capacity, a high capacity density and a large area.

REFERENCE SIGNS LIST

10 Lithium ion secondary battery
11 Negative electrode current collector
12 Positive electrode current collector
13 Negative electrode active material layer
15 Positive electrode active material layer
17 Separator (electrolyte layer)
19 Single battery layer
21 Power generating element
25 Negative electrode current collecting plate
27 Positive electrode current collecting plate
29 Battery outer casing material

The invention claimed is:

1. A flat stacked type non-aqueous electrolyte secondary battery comprising a power generating element including:
a positive electrode comprising a positive electrode active material layer containing a positive electrode active material formed on a surface of a positive electrode current collector,
a negative electrode comprising a negative electrode active material layer containing a negative electrode active material formed on a surface of a negative electrode current collector, and the negative electrode active material contains a carbon material, and
an electrolyte layer, wherein
a ratio of a rated capacity to a pore volume of the negative electrode active material layer is 1.12 Ah/cc or more, a ratio of a battery area to a rated capacity is 4.0 cm$^2$/Ah or more, and a rated capacity is 30 Ah or more,
the electrolyte layer contains an electrolyte solution containing an electrolyte salt dissolved in the electrolyte solution and a value obtained by dividing a weight of an electrolyte salt in pores in the negative electrode active material layer by a weight of the negative electrode active material is from 0.033 to 0.041, and
wherein a Walden product of the electrolyte solution at 0° C. is from 2.9×10$^{-6}$ to 3.2×10$^{-6}$ Pa·s·S·m$^2$·mol$^{-1}$, and
wherein a specific surface area of the negative electrode active material layer is from 1.7 to 2.6 m$^2$/g.

2. The non-aqueous electrolyte secondary battery according to claim 1, wherein the ratio of a battery area to a rated capacity is 10 cm$^2$/Ah or less or the rated capacity is 50 Ah or more.

3. The non-aqueous electrolyte secondary battery according to claim 1, wherein the positive electrode active material is a lithium composite oxide having a composition represented by $Li_aNi_bMn_cCo_dM_xO_2$ (where a, b, c, d and x satisfy 0.9≤a≤1.2, 0<b<1, 0<c≤0.5, 0<d≤0.5, and 0≤x≤0.3, and M is at least one kind selected from Ti, Zr, Nb, W, P, Al, Mg, V, Ca, Sr and Cr).

* * * * *